United States Patent [19]

Iwahashi et al.

[11] 4,308,061
[45] Dec. 29, 1981

[54] AQUEOUS INK COMPOSITION

[75] Inventors: Masaru Iwahashi, Osaka; Shigeyasu Inoue, Kashihara; Yoshinori Murata, Kyoto, all of Japan

[73] Assignee: Sakura Color Products Corporation, Japan

[21] Appl. No.: 211,789

[22] Filed: Dec. 1, 1980

[30] Foreign Application Priority Data

Dec. 12, 1979 [JP] Japan ................................ 54/161094

[51] Int. Cl.$^3$ ............................................. C09D 11/02
[52] U.S. Cl. ........................................ 106/22; 106/20
[58] Field of Search ..................................... 106/22, 20

[56] References Cited

U.S. PATENT DOCUMENTS 4,267,088  5/1981  Kempf .................................. 106/20

FOREIGN PATENT DOCUMENTS 7668318  6/1976  Japan .

Primary Examiner—Lorenzo B. Hayes
Assistant Examiner—Amelia B. Yarbrough
Attorney, Agent, or Firm—Larson and Taylor

[57] ABSTRACT

The present invention provides an aqueous ink composition comprising:

(a) at least one N,N,N',N'-tetrakis-(2-hydroxyalkyl)-ethylenediamine represented by the formula

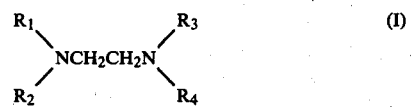

wherein $R_1$, $R_2$, $R_3$ and $R_4$ each represent a group of the formula

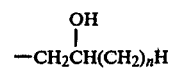

and may be the same, or at least one of these groups may be different from the others, n being zero or an integer of 1 to 3,
(b) a dye,
(c) a hygroscopic water-soluble organic solvent, and
(d) water.

The aqueous ink composition of the invention is used for fountain pens, porous point pens, roller pens or like writing implements, and has an improved storage stability, continuous writability and solution stability.

11 Claims, No Drawings

AQUEOUS INK COMPOSITION

This invention relates to ink compositions used for writing implements, and more particularly to aqueous ink compositions used for fountain pens, porous point pens comprising a writing point made of plastics, fibrous materials such as felt, roller pens comprising a tip having in its socket a ball freely rotatable when in contact with the writing surface.

Aqueous ink compositions heretofore used for the foregoing writing implements have serious drawbacks given below.

(a) Low storage stability: When stored in a container or left out of use as contained in a writing implement such as the one mentioned above for a prolonged period of time, the aqueous ink composition is subject to evaporation, failing to produce a neat and legible writing, thereby reducing writing ability, and eventually rendering the writing implement unusable. The dye in the composition is likely to precipitate to cause discoloration or reduce the concentration. Thus reduced color densities will result.

(b) Poor continuous writability: Air bubbles are liable to lodge in the ink channel within the writing implement, to interrupt continuous flow of the composition, consequently failing to assure continuous and smooth writing.

(c) Low solution stability: At a high dye concentration, conventional ink compositions are amenable to deterioration in quality due to climatic changes especially due to temperature change. In a cold climate or during winter the dye tends to precipitate within a relatively short period of time to cause discoloration. In a hot climate as in summer the ingredients are prone to react with each other to cause the precipitation of the reaction products or discoloration of the ink composition. The dye concentration thus limited presents difficulty in providing aqueous ink compositions which produce high color densities.

To overcome these drawbacks, it has been proposed to add water-soluble organic solvents, such as glycols, glycerin or like polyhydric alcohols, glycol ethers and glycol ether esters, to aqueous ink compositions, but the proposed compositions are not fully satisfactory in storage stability (a), continuous writability (b) and solution stability (c).

Accordingly an object of this invention is to provide aqueous ink compositions having high storage stability. Another object of the invention is to provide aqueous ink compositions having outstanding continuous writability.

Still another object of the invention is to provide aqueous ink compositions having high solution stability.

These objects and other features of the invention will become apparent from the following description.

The present invention provides an ink composition comprising:

(a) about 0.1 to about 20 wt.% of at least one N,N,N',N'-tetrakis-(2-hydroxyalkyl)-ethylenediamine represented by the formula

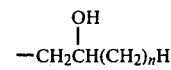

wherein $R_1$, $R_2$, $R_3$ and $R_4$ each represent a group of the formula $$-CH_2CH(OH)(CH_2)_nH$$

and may be the same, or at least one of these groups may be different from the others, n being zero or an integer of 1 to 3, (b) about 0.1 to about 30 wt.% of a dye, (c) about 10 to about 40 wt.% of at least one hygroscopic water-soluble organic solvent, and (d) about 30 to about 80 wt.% of water.

To overcome the drawbacks of conventional aqueous ink compositions, we have conducted extensive research and found that when an N,N,N',N'-tetrakis-(2-hydroxyalkyl)-ethylenediamine of the formula (I) is added to an aqueous solution of a dye and a hygroscopic water-soluble organic solvent, an ink composition is obtained which is usable with satisfactory results free of the drawbacks described above.

The ink composition of this invention has the following outstanding properties.

(i) The composition retains satisfactory writing ability and maintains its color density and is not amenable to evaporation or deterioration in quality even when stored in a container or held contained in a writing implement, such as fountain pen, porous point pen or roller pen, for a prolonged period of time.

(ii) The flow of the composition through the ink channel is not prone to an interruption. Even if the flow is impeded, the composition immediately resumes a smooth flow in use, assuring continuous and smooth writing without any break at all times.

(iii) The composition retains a high concentration and outstanding solution stability without permitting precipitation of the dye even in a hot or cold climate, thus assuring distinct writing with high color density maintained.

The ethylenediamine derivatives of the formula (I) may be used singly or at least two of them may be used conjointly. Typical examples of the ethylenediamine derivatives of the formula (I) are those listed below.

N,N,N',N'-Tetrakis-(2-hydroxyethyl)-ethylenediamine
N,N,N',N'-Tetrakis-(2-hydroxypropyl)-ethylenediamine
N,N,N',N'-Tetrakis-(2-hydroxybutyl)-ethylenediamine
N,N,N',N'-Tetrakis-(2-hydroxypentyl)-ethylenediamine
N-2-Hydroxyethyl-N,N',N'-tri-(2-hydroxypropyl)-ethylenediamine, etc.

Generally the amount of ethylenediamine derivatives of the formula (I) to be used is about 0.1 to about 20%, preferably about 0.5 to about 15%, based on the weight of the ink composition, although variable in accordance with the amounts and kinds of dyes, hygroscopic water-soluble organic solvents, etc.

Dyes useful in this invention are known water-soluble acid dyes, direct dyes and basic dyes. Typical examples of such dyes are given below.

(1) Acid dyes

C.I. Acid Red 87, C.I. Acid Red 92, C.I. Acid Yellow 23, C.I. Acid Blue 9, C.I. Acid Violet 49, C.I. Acid Blue 7, C.I. Acid Orange 56, C.I. Acid Black 2, C.I. Acid Red 18, etc.

(2) Direct dyes

C.I. Direct Black 19, C.I. Direct Black 38, C.I. Direct Black 154, C.I. Direct Orange 6, C.I. Direct Yellow 44, C.I. Direct Yellow 87, C.I. Direct Blue 71, etc.

(3) Basic Dyes

C.I. Basic Red 1, C.I. Basic Violet 10, C.I. Basic Yellow 40, C.I. Basic Violet 1, etc.

Such acid dyes and direct dyes are usable singly or at least two of them are usable in combination, while basic dyes are used singly. The amount of dyes to be used is suitably determined in accordance with the desired color density of the composition, the kinds of dyes, etc. It is usually about 0.1 to about 30%, preferably about 0.5 to about 10%, based on the weight of the ink composition.

The aqueous ink composition of the invention incorporates at least one hygroscopic water-soluble organic solvents (hereinafter referred to as "hygroscopic agent"). Examples of useful hygroscopic agents are:

(a) dihydric alcohols such as ethylene glycol, diethylene glycol, triethylene glycol, polyethylene glycols having an average molecular weight of about 200 to about 1000, 1,3-propanediol, propylene glycol, 1,3-butylene glycol, 2,3-butylene glycol, 1,4-butanediol, neopentyl glycol, hexylene glycol, thiodiglycol, etc.;

(b) tri- and higher-hydric alcohols such as glycerin, diglycerin, trimethylolethane, trimethylolpropane, 3-methyl-pentane-1,3,5-triol, sorbitol, etc.;

(c) glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.;

(d) glycol ether esters such as ethylene glycol monomethyl ether acetate, ethylene glycol monoethyl ether acetate, etc.

Such hygroscopic agents are used in an amount of about 10 to about 40%, preferably about 20 to about 30%, based on the weight of the ink composition. The amount of the hygroscopic agent may be varied in accordance with the kinds and amounts of the ethylenediamine derivatives of the formula (I), etc.

In the present invention the amount of water to be used will usually be about 30 to 80%, preferably about 50 to about 70%, based on the weight of the ink composition, although variable in accordance with the desired concentration of the ink composition, the amount of ethylenediamine derivatives of the formula (I), the kind and amount of the dye, etc.

The aqueous ink composition of this invention is prepared, for example, by adding an ethylenediamine derivative of the formula (I), a dye, a hygroscopic agent to water at the same time or one after another, and stirring the mixture at the temperature between room temperature and about 50° C. to obtain a homogenous solution.

When desired, at least one of surfactants, preservatives, corrosion inhibitors and like additives conventionally used in the art may be incorporated into the aqueous ink composition of this invention. Examples of useful surfactants are nonionic surfactants, such as polyoxyethylene alkyl ether, polyoxyethylene alkylphenyl ether, polypropylene glycol-polyethylene glycol ether, fatty acid esters of polyethylene glycol, silicone-containing surfactants, fluorine-containing surfactants and the like; and anionic surfactants, such as alkylbenzenesulfonates, sodium naphthalenesulfonate-formalin condensates and the like. Examples of useful preservatives are sodium benzoate, potassium sorbate, pentachlorophenol sodium salt, phenol, etc. Examples of useful corrosion inhibitors include benzotriazole and like inhibitors.

The present invention will be described with reference to the following Examples and Comparison Examples, in which the storage stability, continuous writability and solution stability of the ink compositions prepared are determined by the following methods.

(1) Storage stability

A specified quantity of the ink composition is placed into a roller pen comprising a plastics tip containing in its socket a steel ball 0.5 mm in diameter, a feed rod of porous fluorine-containing resin which is connected to an ink reservoir made of polyester fiber, and a barrel made of plastics accommodating the reservoir and measuring 7.0 mm in diameter, 80.0 mm in length.

Five pens, each covered by a cap at the tip, are allowed to stand at room temperature for 1 month, 2 months or 3 months with its point up in an upright position. Then the pens are put to use to determine if each of the pens is capable of producing writings. The result is evaluated according to the following criteria.

A: All of the five pens can produce neat and legible writing.
B: One of the five pens fails to produce writing.
C: Two of the five pens fail to produce writing.
D: Three of the five pens fail to produce writing.

(2) Continuous writability

The ink composition is placed into the same roller pen as used above. The pen is then mounted on a continuous writing tester (equipped with an arm having a pen-attaching portion at one end and turnably supported at the other end) at an angle of 60 degrees with respect to the surface of paper. The pen is driven at a speed of 4.8 m/min under a load of 50 g while moving the paper at a constant speed to draw a continuous curve. The length (m) of the curve continuously drawn without any break is then measured. The result is evaluated according to the following criteria.

A: At least 700 m.
B: 500 to 700 m.
C: 300 to 500 m.
D: Up to 300 m.

(3) Solution stability

The ink composition is placed into a bottle, then allowed to stand at room temperature, 50° C. or 0° C. for 3 months and thereafter checked with the unaided eye for discoloration in comparison with the color of the same composition immediately after preparation. The composition is also filtered with a filter paper (trade mark "Toyo Roshi No. 2," product of Toyo Roshi Kabushiki Kaisha, Japan) to observe precipitate, if any. The result is evaluated according to the following criteria.

A: No discoloration and free from any precipitate.
B: No discoloration but some precipitate.
C: Reduced color density with much precipitate.

EXAMPLE 1

The following ingredients are added to water, and the resulting mixture is stirred at about 30° C. for 2 hours to obtain a red ink according to the invention.

| Ingredients | wt. parts |
|---|---|
| Acid dye (Trade Mark "Eosinet", a product of | 5.0 |

-continued

| Ingredients | wt. parts |
| --- | --- |
| Hodogaya Kagaku Kogyo Kabushiki Kaisha, Japan, C.I. Acid Red 87) | |
| Acid dye | 2.0 |
| (Trade Mark "Tartrazine conc.", a product of Hodogaya Kagaku Kogyo Kabushiki Kaisha, Japan, C.I. Acid Yellow 23) | |
| N,N,N',N'-Tetrakis-(2-hydroxypropyl)-ethylenediamine | 7.0 |
| Ethylene glycol | 24.0 |
| Sodium benzoate | 1.0 |
| Polyoxyethylene alkyl ether | 0.1 |
| (Trade Mark "Scourol #400", a product of Kao-Atlas Kabushiki Kaisha, Japan) | |
| Water | 60.9 |

The ink thus obtained is tested for storage stability, continuous writability and solution stability. The results are shown in Table 1. Table 1 also lists the results obtained with respect to the inks prepared in the Examples and Comparison Examples that follow.

EXAMPLE 2

The following ingredients are mixed together under stirring at about 40° C. for 2 hours to obtain a blue ink according to the invention.

| Ingredients | wt. parts |
| --- | --- |
| Acid dye | 6.0 |
| (Trade Mark "Water Blue #9", Orient Chemical Company Limited, Japan, C.I. Acid Blue 9) | |
| N,N,N',N'-Tetrakis-(2-hydroxypropyl)-ethylenediamine | 5.0 |
| Ethylene glycol | 25.0 |
| Glycerin | 2.0 |
| Sodium benzoate | 1.0 |
| Polyoxyethylene alkyl ether (the same one as in Example 1) | 0.1 |
| Water | 60.9 |

EXAMPLE 3

A green ink is prepared in the same manner as in Example 1 except that the following ingredients are used.

| Ingredients | wt. parts |
| --- | --- |
| Acid dye | 4.0 |
| (Trade Mark "Water Blue #9", C.I. Acid Blue 9) | |
| Acid dye | 4.0 |
| (Trade Mark "Tartrazine conc.", C.I. Acid Yellow 23) | |
| N,N,N',N'-Tetrakis-(2-hydroxypropyl)-ethylenediamine | 1.0 |
| Polyethylene glycol | 20.0 |
| (Trade Mark "Polyethylene Glycol #300", a product of Sanyo Kasei Kogyo Kabushiki Kaisha, Japan, average molecular weight: about 300) | |
| Ethylene glycol | 10.0 |
| Sodium benzoate | 1.0 |
| Polyoxyethylene alkyl ether | 0.1 |
| (Trade Mark "Noigen P", a product of Daiichi Kogyo Company Limited, Japan) | |
| Water | 59.9 |

EXAMPLE 4

A black ink is prepared by using the following ingredients. First the following two kinds of dyes are mixed with water. Then to the mixture are added the remaining ingredients and the resulting mixture is stirred at about 35° C. for 2 hours, giving the ink of the invention.

| Ingredients | wt. parts |
| --- | --- |
| Acid dye | 2.0 |
| (Trade Mark "Nigrosine NB conc.", Japan, C.I. Acid Black 2) | |
| Direct dye | 5.0 |
| (Trade Mark "Water Black #100", a product of Orient Chemical Co., Ltd., Japan, C.I. Direct Black 19) | |
| N,N,N',-Tetrakis-(2-hydroxypropyl)-ethylenediamine | 3.0 |
| Thiodiglycol | 5.0 |
| Ethylene glycol | 25.0 |
| Potassium sorbate | 0.5 |
| Polyoxyethylene alkyl ether (the same one as in Example 1) | 0.1 |
| Water | 59.4 |

EXAMPLE 5

An aqueous ink is prepared in the same manner as in Example 1 except that the following ingredients are used.

| Ingredients | wt. parts |
| --- | --- |
| Direct dye | 6.0 |
| (Trade Mark "Kayarus Black G conc.", Nihon Kayaku Kabushiki Kaisha, Japan, C.I. Direct Black 19) | |
| N,N,N',N'-Tetrakis-(2-hydroxypropyl)-ethylenediamine | 10.0 |
| Ethylene glycol | 20.0 |
| Thiodiglycol | 5.0 |
| Potassium sorbate | 0.5 |
| Polyoxyethylene alkyl ether (the same one as in Example 1) | 0.1 |
| Water | 58.4 |

EXAMPLE 6

A green ink is prepared in the same manner as in Example 1 except that the following ingredients are used.

| Ingredients | wt. parts |
| --- | --- |
| Acid dye | 4.0 |
| (Trade Mark "Water Blue #9", C.I. Acid Blue 9) | |
| Acid dye | 4.0 |
| (Trade Mark "Tartrazine conc.", C.I. Acid Yellow 23) | |
| N,N,N',N'-Tetrakis-(2-hydroxypropyl)-ethylenediamine | 15.0 |
| Polyethylene glycol (the same one as in Example 3) | 10.0 |
| Sodium benzoate | 1.0 |
| Polyoxyethylene alkyl ether (the same one as in Example 3) | 0.1 |
| Water | 65.9 |

EXAMPLE 7

A red ink according to the invention is prepared in the same manner as Example 1 except that the following ingredients are used.

| Ingredients | wt. parts |
| --- | --- |
| Acid dye | 5.0 |
| (Trade Mark "Eosine", C.I. Acid Red 87) | |
| N,N,N',N'-Tetrakis-(2-hydroxyethyl)-ethylenediamine | 1.0 |
| Ethylene glycol | 29.0 |
| Ethylene glycol monomethyl ether acetate | 1.0 |
| Sodium benzoate | 1.0 |
| Water | 63.0 |

EXAMPLE 8

A red ink according to the invention is prepared in the same manner as in Example 1 except that the following ingredients are used.

| Ingredients | wt. parts |
| --- | --- |
| Acid dye | 5.0 |
| (Trade Mark "Eosine", C.I. Acid Red 87) | |
| Acid dye | 2.0 |
| (Trade Mark "Tartrazine conc.", C.I. Acid Yellow 23) | |
| N,N,N',N'-Tetrakis-(2-hydroxyethyl)-ethylenediamine | 2.0 |
| Ethylene glycol | 30.0 |
| Pentachlorophenol sodium salt | 0.5 |
| Banzo-triazole | 0.1 |
| Water | 60.4 |

EXAMPLE 9

A black ink according to the invention is prepared in the same manner as in Example 1 except that the following ingredients are used.

| Ingredients | wt. parts |
| --- | --- |
| Direct dye | 6.0 |
| (Trade Mark "Kayarus Black G conc.", C.I. Direct Black 19) | |
| N,N,N',N'-Tetrakis-(2-hydroxyethyl)-ethylenediamine | 6.0 |
| Ethylene glycol | 25.0 |
| Ethylene glycol monomethyl ether | 1.0 |
| Potassium sorbate | 0.5 |
| Polyoxyethylene alkyl ether (the same one as in Example 1) | 0.1 |
| Water | 61.4 |

EXAMPLE 10

A red ink according to the invention is prepared in the same manner as in Example 1 except that the following ingredients are used.

| Ingredients | wt. parts |
| --- | --- |
| Acid dye | 3.0 |
| (Trade Mark "Acid Phloxine PB", a product of Hodogaya Kagaku Kogyo, Kabushiki Kaisha, Japan, C.I. Acid Red 92) | |
| Acid dye | 2.0 |
| (Trade Mark "Kayanol Milling Orange", a product of Nihon Kayaku, Kabushiki Kaisha, Japan, C.I. Acid Orange 56) | |
| N,N,N',N'-Tetrakis-(2-hydroxybutyl)-ethylenediamine | 4.0 |
| Ethylene glycol | 30.0 |
| Sodium benzoate | 1.0 |
| Benzo-triazole | 0.1 |
| Water | 59.9 |

EXAMPLE 11

A blue ink according to the invention is prepared in the same manner as in Example 1 except that the following ingredients are used.

| Ingredients | wt. parts |
| --- | --- |
| Acid dye | 4.0 |
| (Trade Mark "Kayacyl Pure Blue FGA", a product of Nihon Kayaku, Kabushiki Kaisha, Japan, C.I. Acid Blue 7) | |
| Acid dye | 1.0 |
| (Trade Mark "Acid Violet 6B", a product of Hodogaya Kagaku Kabushiki Kaisha, Japan, C.I. Acid Violet 49) | |
| N,N,N',N'-Tetrakis-(2-hydroxybutyl)-ethylenediamine | 2.0 |
| Ethylene glycol | 30.0 |
| Phenol | 0.1 |
| Water | 62.9 |

EXAMPLE 12

A black ink of the invention is prepared in the same manner as in Example 1 except that the following ingredients are used.

| Ingredients | wt. parts |
| --- | --- |
| Direct dye | 6.0 |
| (Trade Mark "Direct Deep Black EX", C.I. Direct Black 38) | |
| N,N,N',N'-Tetrakis-(2-hydroxybutyl)-ethylenediamine | 1.0 |
| Thiodiglycol | 27.0 |
| Diethylene glycol monomethyl ether | 2.0 |
| Pentachlorophenol sodium salt | 0.5 |
| Polyoxyethylene alkyl ether (the same one as in Example 1) | 0.1 |
| Water | 63.4 |

EXAMPLE 13

A blue ink according to the invention is prepared in the same manner as in Example 1 except that the following ingredients are used.

| Ingredients | wt. parts |
| --- | --- |
| Direct dye | 5.0 |
| (Trade Mark "Sumilight supra Blue BRR conc.", a product of Sumitomo Chemical Co., Ltd., Japan, C.I. Direct Blue 71) | |
| N,N,N',N'-Tetrakis-(2-hydroxypentyl)-ethylenediamine | 0.5 |
| Ethylene glycol | 29.0 |
| Diethylene glycol monobutyl ether | 1.0 |
| Sodium benzoate | 1.0 |
| Water | 63.5 |

EXAMPLE 14

A red ink of the invention is prepared in the same manner as in Example 1 except that the following ingredients are used.

| Ingredients | wt. parts |
|---|---|
| Acid dye | 5.0 |
| (Trade Mark "Eosine", C.I. Acid Red 87) | |
| Direct dye | 1.0 |
| (Trade Mark "Nippon Orange GG conc." Sumitomo Chemical Co., Ltd., Japan, C.I. Direct Orange 6) | |
| N,N,N',N'-Tetrakis-(2-hydroxypentyl)-ethylenediamine | 1.0 |
| Ethylene glycol | 27.0 |
| Pentachlorophenol sodium salt | 0.5 |
| Water | 65.5 |

EXAMPLE 15

A black ink of the invention is prepared in the same manner as in Example 1 except that the following ingredients are used.

| Ingredients | wt. parts |
|---|---|
| Direct dyes | 6.0 |
| (Trade Mark "Direct Deep Black XA", a product of Nihon Kayaku, Kabushiki Kaisha, Japan, C.I. Direct Black 154) | |
| N,N,N',N'-Tetrakis-(2-hydroxypentyl)-ethylenediamine | 0.7 |
| Thiodiglycol | 29.0 |
| Phenol | 0.1 |
| Polyoxyethylene alkyl ether | 0.1 |
| (the same one as in Example 1) | |
| Water | 64.1 |

EXAMPLE 16

A red ink of the invention is prepared in the same manner as in Example 1 except that the following ingredients are used.

| Ingredients | wt. parts |
|---|---|
| Direct dye | 1.0 |
| (Trade Mark "Kayarus Light Yellow F8G", a product of Nihon Kayaku, Kabushiki Kaisha, Japan, C.I. Direct Yellow 87) | |
| Acid dye | 5.0 |
| (Trade Mark "Eosine", C.I. Acid Red 87) | |
| N-2-Hydroxyethyl-N,N',N'-tris-(2-hydroxypropyl)-ethylenediamine | 8.0 |
| Thiodiglycol | 23.0 |
| Phenol | 0.1 |
| Ethylene glycol monomethyl ether acetate | 1.0 |
| Water | 61.9 |

EXAMPLE 17

A red ink of the invention is prepared in the same manner as in Example 1 except that the following ingredients are used.

| Ingredients | wt. parts |
|---|---|
| Basic dye | 3.0 |
| (Trade Mark "Rhodamine 6GCP", a product of Sumitomo Chemical Co., Ltd., Japan, C.I. Basic Red 1) | |
| Basic dye | 1.0 |
| (Trade Mark "Rhodamine B", a product of Sumitomo Chemical Co., Ltd., Japan, C.I. Basic Violet 10) | |
| N,N,N',N'-Tetrakis-(2-hydroxypropyl)-ethylenediamine | 2.0 |
| Ethylene glycol | 30.0 |
| Water | 64.0 |

COMPARISON EXAMPLE 1

Comparison ink is prepared in the same manner as in Example 4 except that the ethylenediamine derivative is replaced with the equal amount of water.

COMPARISON EXAMPLE 2

Comparison ink is prepared in the same manner as in Example 5 except that the ethylenediamine derivative is replaced with the equal amount of water.

COMPARISON EXAMPLE 3

Comparison ink is prepared in the same manner as in Example 9 except that the ethylenediamine derivative is replaced with the equal amount of water.

COMPARISON EXAMPLE 4

Comparison ink is prepared in the same manner as in Example 10 except that the ethylenediamine derivative is replaced with the equal amount of water.

COMPARISON EXAMPLE 5

Comparison ink is prepared in the same manner as in Example 14 except that the ethylenediamine derivative is replaced with the equal amount of water.

TABLE 1

| | Storage Stability | | | Continuous Writability | Solution Stability | | |
|---|---|---|---|---|---|---|---|
| | 1 month | 2 months | 3 months | | room temp. | 50° C. | 0° C. |
| Ex. 1 | A | A | A | B | A | A | A |
| 2 | A | A | A | A | A | A | A |
| 3 | A | A | A | A | A | A | A |
| 4 | A | A | A | A | A | A | A |
| 5 | A | A | A | A | A | A | A |
| 6 | A | A | A | A | A | B | A |
| 7 | A | A | A | B | A | A | A |
| 8 | A | A | A | A | A | A | A |
| 9 | A | A | A | A | A | A | A |
| 10 | A | A | A | A | A | B | A |
| 11 | A | A | A | A | A | A | A |
| 12 | A | A | A | A | A | A | A |
| 13 | A | A | A | A | A | A | A |
| 14 | A | A | A | A | A | A | A |
| 15 | A | A | A | A | A | B | A |
| 16 | A | A | A | A | A | A | A |
| 17 | A | A | A | A | A | A | A |
| Comp. Ex. 1 | A | B | C | C | B | B | B |
| 2 | B | C | D | D | C | C | B |
| 3 | C | D | D | D | C | C | B |
| 4 | B | C | D | C | B | C | B |
| 5 | B | B | C | D | B | C | B |

As apparent from Table 1, the aqueous ink compositions of this invention are excellent in all the properties of storage stability, continuous writability and solution stability.

We claim:

1. An aqueous ink composition comprising:

(a) about 0.1 to about 20 wt.% of at least one N,N,N',N'-tetrakis-(2-hydroxyalkyl)-ethylenediamine represented by the formula

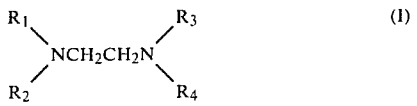 (I)

wherein $R_1$, $R_2$, $R_3$ and $R_4$ each represent a group of the formula

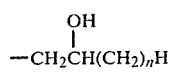

and may be the same, or at least one of these groups may be different from the others, n being zero or an integer of 1 to 3,
(b) about 0.1 to about 30 wt.% of a water-soluble dye,
(c) about 10 to about 40 wt.% of at least one hygroscopic water-soluble organic solvent, and
(d) about 30 to about 80 wt.% of water.

2. A composition as defined in claim 1 wherein N,N,N',N'-tetrakis-(2-hydroxyalkyl)-ethylenediamine of the formula (I) is at least one member selected from the group consisting of N,N,N',N'-tetrakis-(2-hydroxyethyl)-ethylenediamine, N,N,N',N'-tetrakis-(2-hydroxypropyl)-ethylenediamine, N,N,N',N'-tetrakis-(2-hydroxybutyl)-ethylenediamine, N,N,N',N'-tetrakis-(2-hydroxypentyl)-ethylenediamine and N-2-hydroxyethyl-N,N',N'-tris-(2-hydroxypropyl)-ethylenediamine.

3. A composition as defined in claim 1 which comprises about 0.5 to about 15 wt.% of the N,N,N',N'-tetrakis(2-hydroxyalkyl)-ethylenediamine.

4. A composition as defined in claim 1 wherein the dye is an acid dye, a direct dye, a mixture of these dyes, or a basic dye.

5. A composition as defined in claim 3 wherein the acid dye is at least one of
C.I. Acid Red 87, C.I. Acid Red 92, C.I. Acid Yellow 23, C.I. Acid Blue 9, C.I. Acid Violet 49, C.I. Acid Blue 7, C.I. Acid Orange 56, C.I. Acid Black 2, and C.I. Acid Red 18.

6. A composition as defined in claim 3 wherein the direct dye is at least one of
C.I. Direct Black 19, C.I. Direct Black 38, C.I. Direct Black 154, C.I. Direct Orange 6, C.I. Direct Yellow 44, C.I. Direct Yellow 87, and C.I. Direct Blue 71.

7. A composition as defined in claim 3 wherein the basic dye is at least one of
C.I. Basic Red 1, C.I. Basic Violet 10, C.I. Basic Yellow 40, and C.I. Basic Violet 1.

8. A composition as defined in claim 1 which comprises about 0.5 to about 10 wt.% of the dye.

9. A composition as defined in claim 1 wherein the hygroscopic water-soluble organic solvent is at least one member selected from the group consisting of (a) dihydric alcohols, (b) tri- and higher-hydric alcohols, (c) glycol ethers and (d) glycol ether esters.

10. A composition as defined in claim 1 which comprises about 20 to about 30 wt.% of the hygroscopic water-soluble organic solvent.

11. A composition as defined in claim 1 which comprises about 50 to about 70 wt.% of water.

* * * * *